(12) United States Patent
McCarten et al.

(10) Patent No.: US 12,464,260 B2
(45) Date of Patent: Nov. 4, 2025

(54) TIME CENTERED HIGH-DYNAMIC-RANGE READOUT

(71) Applicants: John P McCarten, Penfield, NJ (US); Namwoong Paik, Lawrenceville, NJ (US)

(72) Inventors: John P McCarten, Penfield, NJ (US); Namwoong Paik, Lawrenceville, NJ (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 17/974,378

(22) Filed: Oct. 26, 2022

(65) Prior Publication Data

US 2023/0134194 A1    May 4, 2023

Related U.S. Application Data

(60) Provisional application No. 63/274,420, filed on Nov. 1, 2021.

(51) Int. Cl.
| | |
|---|---|
| H04N 25/589 | (2023.01) |
| H04N 23/61 | (2023.01) |
| H04N 23/741 | (2023.01) |
| H04N 23/951 | (2023.01) |
| H04N 25/531 | (2023.01) |
| H04N 25/533 | (2023.01) |

(52) U.S. Cl.
CPC ......... *H04N 25/589* (2023.01); *H04N 23/61* (2023.01); *H04N 23/741* (2023.01); *H04N 23/951* (2023.01); *H04N 25/531* (2023.01); *H04N 25/533* (2023.01)

(58) Field of Classification Search
None
See application file for complete search history.

(56) References Cited

U.S. PATENT DOCUMENTS

| | | | |
|---|---|---|---|
| 9,076,233 B2* | 7/2015 | Hasu | G06T 5/50 |
| 2007/0268396 A1* | 11/2007 | Kurane | H04N 25/583 |
| | | | 348/E5.037 |
| 2009/0268055 A1* | 10/2009 | Hamilton, Jr. | H04N 25/46 |
| | | | 348/230.1 |
| 2013/0027594 A1* | 1/2013 | Krymski | H04N 25/75 |
| | | | 348/300 |
| 2013/0089175 A1* | 4/2013 | Mo | H04N 25/77 |
| | | | 377/49 |

(Continued)

*Primary Examiner* — Quan Pham
(74) *Attorney, Agent, or Firm* — Rutan and Tucker, LLP (57) ABSTRACT

A time centering module cooperates with an image sensor that is configured to capture two or more image captures at least one of 1) several different lengths of exposures of a same subject matter, 2) several different integration times for that same subject matter, and 3) any combination of these, that are to be merged into a High Dynamic Range (HDR) image capture. The time centering module is also configured to cooperate with data storage components. The time centering module correlates image data of a moving object from the two or more image captures stored in the data storage component. The image captures each have different integration times in a rolling shutter or different lengths of exposures in a global shutter in order to correlate the image data of the moving object in image captures by a midpoint in time of their respective image capture.

18 Claims, 6 Drawing Sheets

(56) References Cited

U.S. PATENT DOCUMENTS

| | | | |
|---|---|---|---|
| 2015/0103209 A1* | 4/2015 | Elhachimi | H04N 23/745 348/239 |
| 2015/0326836 A1* | 11/2015 | Shin | H04N 23/73 348/308 |
| 2017/0150030 A1* | 5/2017 | Nakamura | H04N 23/745 |

* cited by examiner

TIME CENTERED HIGH-DYNAMIC-RANGE READOUT

CROSS-REFERENCE

This application claims priority under 35 USC 119 to U.S. provisional patent application Ser. No. 63/274,420, titled "TIME CENTERED HIGH-DYNAMIC-RANGE READOUT," filed 1 Nov. 2021, which the disclosure of such is incorporated herein by reference in its entirety.

TECHNICAL FIELD

An embodiment of a concept herein relates to techniques and tools in an image sensor.

BACKGROUND

Time interleaved exposures allow for segmentation of a scene. For example, see US20110242334A1 published patent application, titled "Time interleaved exposures and multiplexed illumination." Likewise, pixels can have a variable exposure to capture a scene. For example, see US20180115725A1 published patent application, titled "flexible pixel—wise exposure control and readout."

SUMMARY

Provided herein are various methods, apparatuses, and systems for an image sensor with a pixel array.

In an embodiment, a time centering module cooperates with an image sensor that is configured to capture two or more image captures at least one of 1) several different lengths of exposures of a same subject matter, 2) several different integration times for that same subject matter, and 3) any combination of these, that are to be merged into a High Dynamic Range (HDR) image capture. The time centering module is also configured to cooperate with data storage components. The time centering module correlates image data of a moving object from the two or more image captures stored in the data storage component. The image captures each have different integration times in a rolling shutter or different lengths of exposures in a global shutter in order to correlate the image data of the moving object in image captures by a midpoint in time of their respective image capture.

The time centering module is also configured to cooperate with a data storage component. The data storage component can be at least one of the following.

I) A time centering memory that is located in an HDR readout pipeline from an output of an image sensor. The time centering module can correlate image data of a moving object from the two or more image captures stored in the time centering memory. The time centering module can correlate the image data of the moving object from the two or more image captures coming from the image sensor that each have different integration times in a rolling shutter or different lengths of exposures in a global shutter in order to correlate the image data of the moving object in image captures by a midpoint in time of their respective image capture.

II) An image data collection memory and an associated cache that is located within the image sensor. The time centering module can make a comparison between at least one of 1) i) image data containing the moving object in one or more previous image captures to ii) image data containing the moving object in a current image capture in a rolling shutter implementation; and 2) iii) one or more previous frames containing image data of the moving object in previous image captures to iv) a current frame containing image data of the moving object in the current image capture in a global shutter implementation. The time centering module can correlate the image data of the moving object in image captures that each have different integration times and/or different exposures together by a midpoint in time of their respective integration time and/or length of exposure in order to minimize blur in an HDR image capture.

These and many more embodiments are discussed.

DRAWINGS

Various example embodiments can be more completely understood in consideration of the following detailed description in connection with the accompanying drawings, in which.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details can be set forth, such as examples of specific data signals, named components, number of frames, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as the first server, can be made. However, the specific numeric reference should not be interpreted as a literal sequential order but rather interpreted that the first server is different than a second server. Thus, the specific details set forth can be merely exemplary. The specific details can be varied from and still be contemplated to be within the spirit and scope of the present design. The term "coupled" is defined as meaning connected either directly to the component or indirectly to the component through another component.

The time centering module is configured to coordinate a timing and data readout scheme to time-center High-Dynamic-Range (HDR) readouts in some examples, via the use of memory storage and data pointers, while minimizing motion blur for an HDR image capture. The time centering module coordinates the timing and data readout scheme to time-center image data from multiple image captures to merge the image data from all those different image captures in order to capture a much higher image quality for the merged HDR image capture and minimize an amount of blur created by any slight movements of an object captured in the HDR image capture by moving the integration point into the midpoint in time, via a data pointer. The time centering module can coordinate the timing and data readout scheme for image sensors using both rolling shutter and global shutter readouts.

HDR image capture captures multiple HDR images by taking several different exposures of the same subject matter and then combining several different exposures of the same subject matter. Combining several different, narrower range, exposures and merging the results into a combined (HDR) image with a greater dynamic range than what is possible by taking one single exposure. In some examples, HDR imaging for machine vision, automotive, or any other image captures with moving objects generates blur artifacts. These blur artifacts are due to mismatches in the integration times for the multiple captures. In addition, some HDR image captures employ complicated computer algorithms that consume a lot of battery.

Figure 1:
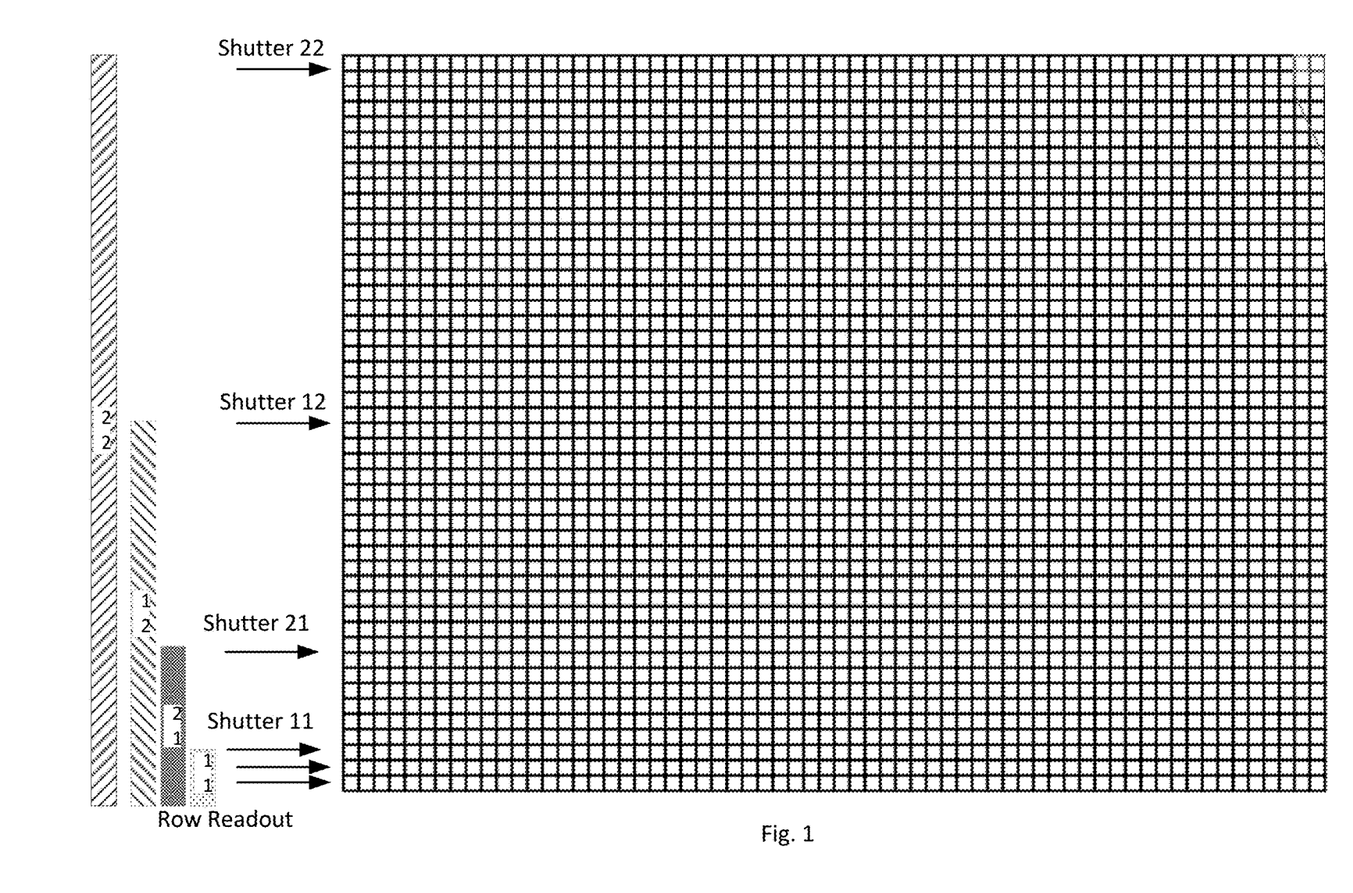
FIG. 1 illustrates a diagram of an example image sensor configured to create a High-Dynamic-Range image capture across a pixel array.

FIG. 1 illustrates a diagram of an example image sensor configured to create a High-Dynamic-Range image capture across a pixel array. FIG. 1 shows an example of a rolling shutter readout. The image sensor captures multiple HDR images by taking and then combining several different exposures of the same subject matter.

FIG. 1 shows bar graphs of a duration of image captures 11, 12, 21, and 22, which are all read out at the end of the integration time for the last rows of the rolling shutter pixel array.

A timing generator sends signals to a scanner to shutter row 1 (shutter 22) to start the integration time for the pixel locations in these sub-rows. The timing generator next sends signals to a scanner to shutter row 12 (shutter 12) to start the integration time for the pixel locations in these sub-rows. The timing generator sends signals to a scanner to shutter row 21 (shutter 21) to start the integration time for the pixel locations in these sub-rows. The timing generator sends signals to a scanner to shutter row 35 (shutter 11) to start the integration time for the pixel locations in these sub-rows. Next, the timing generator sends signals to the scanner to readout out row 37 (Row readout) and row 38 (Row readout) to transfer the charge collected from the different rows of pixels in the array to a register. The image sensor reads out all of the image captures at the same time. A sense amplifier can measure the value of each charge cloud and converts that charge into a voltage. An analog to digital converter digitizes the charge/pixel values and output the digital voltage values of each pixel. The image comprised of pixel values can be processed in software and then the image can be displayed on a display screen. In this example, the charge from the integration of shutter 22 is first processed. Next, the charge from the integration of shutter 12 is processed. Next, the charge from the integration of shutter 21 is processed. Lastly, the charge from the integration of shutter 11 is processed at last.

Note, in an example rolling shutter, all of the pixels in the pixel array in the image sensor are not exposed simultaneously and each row of sensor pixels is scanned sequentially. The rolling shutter mode in the image sensor exposes the pixel rows one after the other, with a temporal offset from one row to the next. At first, the top row of the image capture starts collecting the light and finishes it. And then, the next row down starts collecting light. This causes a delay in the ending and starting time of light collection for consecutive rows.

Note, an example global shutter sensor exposes all the pixels of the array at the same time. The example global shutter mode in an image sensor allows all the sensor's pixels to start exposing and stop exposing simultaneously for the programmed exposure period during every image capture acquisition. After the end of the exposure time, pixel data readout begins and proceeds row by row until all of the pixel data has been read.

Referring to FIG. 1, the standard scheme readouts each pixel in the pixel array at the same time, but the start of integration is at different times. Also, readout starts simultaneously and continues until all rows are readout. Therefore, the signal read time for all of the pixels is not time centered.

Figure 2:
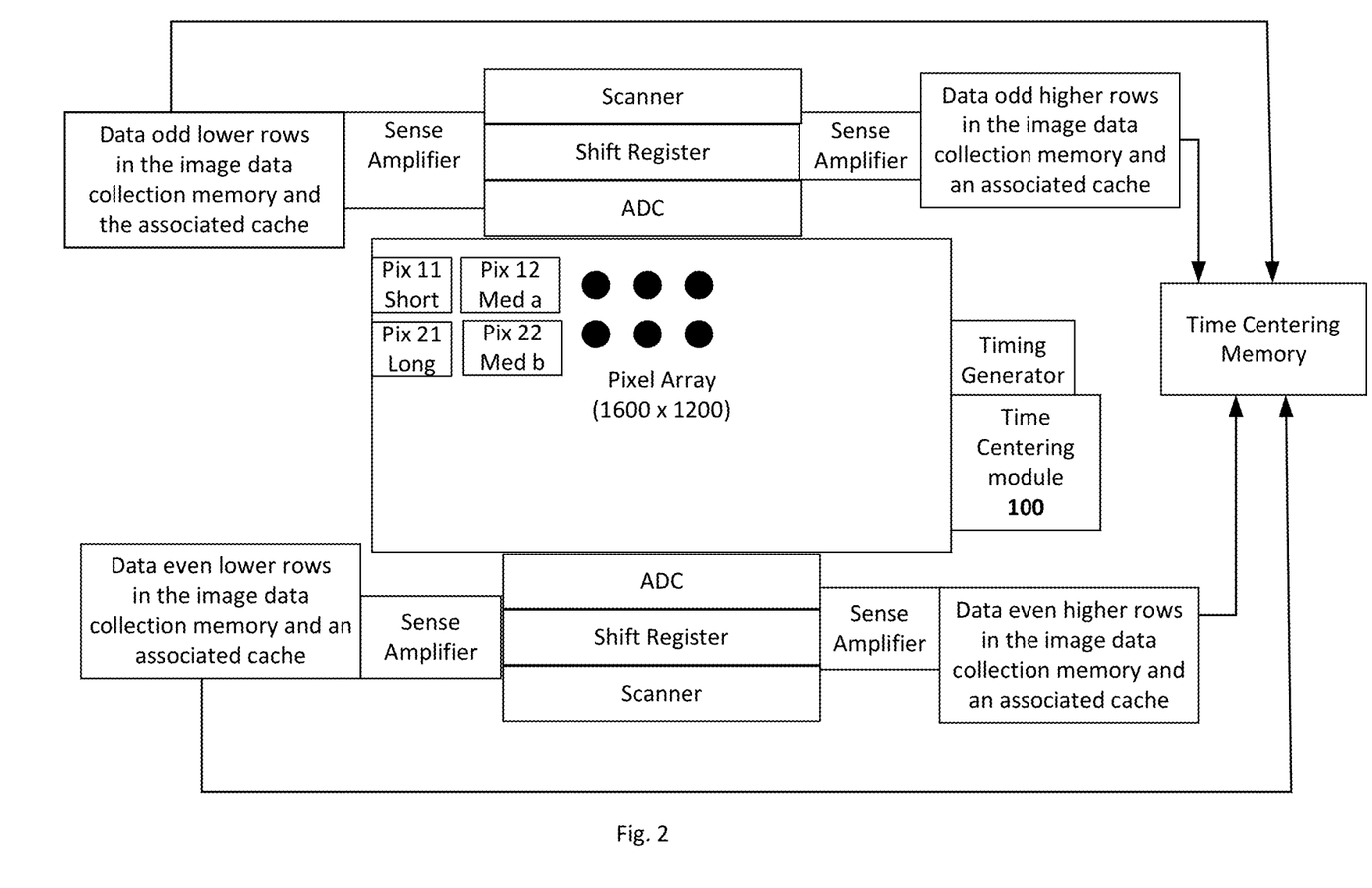
FIG. 2 illustrates a diagram of an example image sensor block with a time centering module, a time centering memory, an image data collection memory and an associated cache within the image sensor, and other components to generate HDR image captures that minimize motion blur for both rolling shutter and global shutter readouts.

A limitation for most multi-exposure HDR photography is that any movement between successive images will substantially impede or prevent success in combining FIG. 2 illustrates a diagram of an example image sensor block with a time centering module, a time centering memory, an image data collection memory and an associated cache within the image sensor, and other components to generate HDR image captures that minimize motion blur for both rolling shutter and global shutter readouts. The image sensor has some example components that include a pixel array (1600×1200), one or more sense amplifiers, one or more scanners, one or more shift registers, one or more analog to digital converters (ADCs), a timing generator, one or more image data collection memories and the associated caches, a time centering module 100, a time centering memory, and other similar components.

The time centering module 100 works with the image sensor. The time centering module 100 works with at least one of 1) a time centering memory positioned in an HDR readout pipeline of an image sensor and 2) an image data collection memory and an associated cache of the image sensor.

The time centering module 100 directs the image sensor to capture two or more image captures at least one of 1) several different lengths of exposures of a same subject matter, 2) several different integration times for that same subject matter, and 3) any combination of these, that are to be merged into an HDR image capture.

The time centering module 100 can direct signals and data pointers to time center i) different rows of pixels for a rolling shutter and/or ii) different frames for a global shutter that are being integrated and then eventually being merged into an HDR image capture.

Note, an integration time can be the interval during in which the camera's time generator clocks photodiodes making up a pixel are set to trap and retain charge. An integration time for a particular readout can be the time period from the start of integration/collection of charge/image data to the readout of the image data. The integration can be delimited by the behavior of the readout electronics, and can be entirely independent of the exposure made by the shutter. An exposure can be the interval of time in which the camera is both exposing light to the pixels in a pixel array and integrating. The start of the integration for each pixel occurs earlier in time than the readout operation, and is a fixed number of rows from the readout line.

The time centering memory can be positioned/located in an HDR readout pipeline from an output of an image sensor. The time centering memory can be located on the image sensor chip or external to the image sensor chip itself.

The time centering module 100 can correlate image data of a moving object from the two or more image captures stored in the time centering memory. The time centering module 100 correlates the image data of the moving object from the two or more image captures coming from the image sensor that each have i) different integration times in a rolling shutter or ii) different lengths of exposures in a global shutter, by a midpoint in time of their respective image capture. The midpoint in time of an image capture can be, for example, a time center, an average value, a median value, or some other mathematical middle point.

The time centering module 100 can make a comparison between i) image data containing the moving object in one or more previous image captures to ii) image data containing the moving object in a current image capture in a rolling shutter. The time centering module 100 can determine a start of the integration time and an end of the integration time in each image capture in the rolling shutter implementation stored in the time centering memory and use the start and end of the integration time to derive the midpoint in time for each image capture to be merged into the HDR image capture. The time centering module 100 can also make a comparison between iii) one or more previous frames containing image data of the moving object in image captures to iv) a current frame containing image data of the moving object in an image capture in a global shutter. The time centering module 100 makes the comparison to correlate the image data of the moving object in image captures that each have different integration times and/or different exposures together by the midpoint of their respective integration time and/or length of exposure. The time centering module 100 can determine the length of exposure of each frame of image capture stored in the time centering memory in the global shutter implementation to derive the midpoint in time for each image capture to be merged into the HDR image capture and then to align the image captures along their midpoint in time for each image capture.

The time centering module 100 can correlate image data of a moving object from the two or more image captures stored in the image data collection memory and an associated cache within the image sensor. The time centering module 100 is configured to work with the image data collection memory and the associated cache to compare between i) the image data containing the moving object of one or more previous image captures stored in the image data collection memory to ii) the image data of containing the moving object in the current image capture in the associated cache in the rolling shutter implementation to determine the midpoint in time for the current row of image data and then align the image captures along their midpoint in time for each image capture.

The time centering module 100 works with the image data collection memory and the associated cache to compare between i) the one or more previous frames of image data of the image captures and ii) the current frame of image data for the image capture in the global shutter implementation to determine the midpoint in time for the current frame of image data, and then to align the image captures along their midpoint in time for each image capture.

For the timing, the shutter address pointers and readout address pointers are shifted to time center of the exposure for a given row. Image data must be stored for at least ½ of a frame, but there is no latency issue compared to example methods not doing time centering.

The time centering memory is sized in byte capacity to store at least a half of a frame of image data of the mega pixel size of the image sensor.

The time centering memory with the ½ frame or more in capacity cooperating the time centering module 100 has good HDR motion blur performance. The addition of the ½ frame or more of memory in the pipeline improves image quality. In addition, the time centering memory with the ½ frame or more in capacity cooperating the time centering module 100 allows spatial resync of the row data. The time centering memory can be located on and integrated with the image sensor chip. The ½ frame of time centering memory to store image data for time centering can also be located off-chip from the image sensor in the image processing pipeline.

Figure 3:
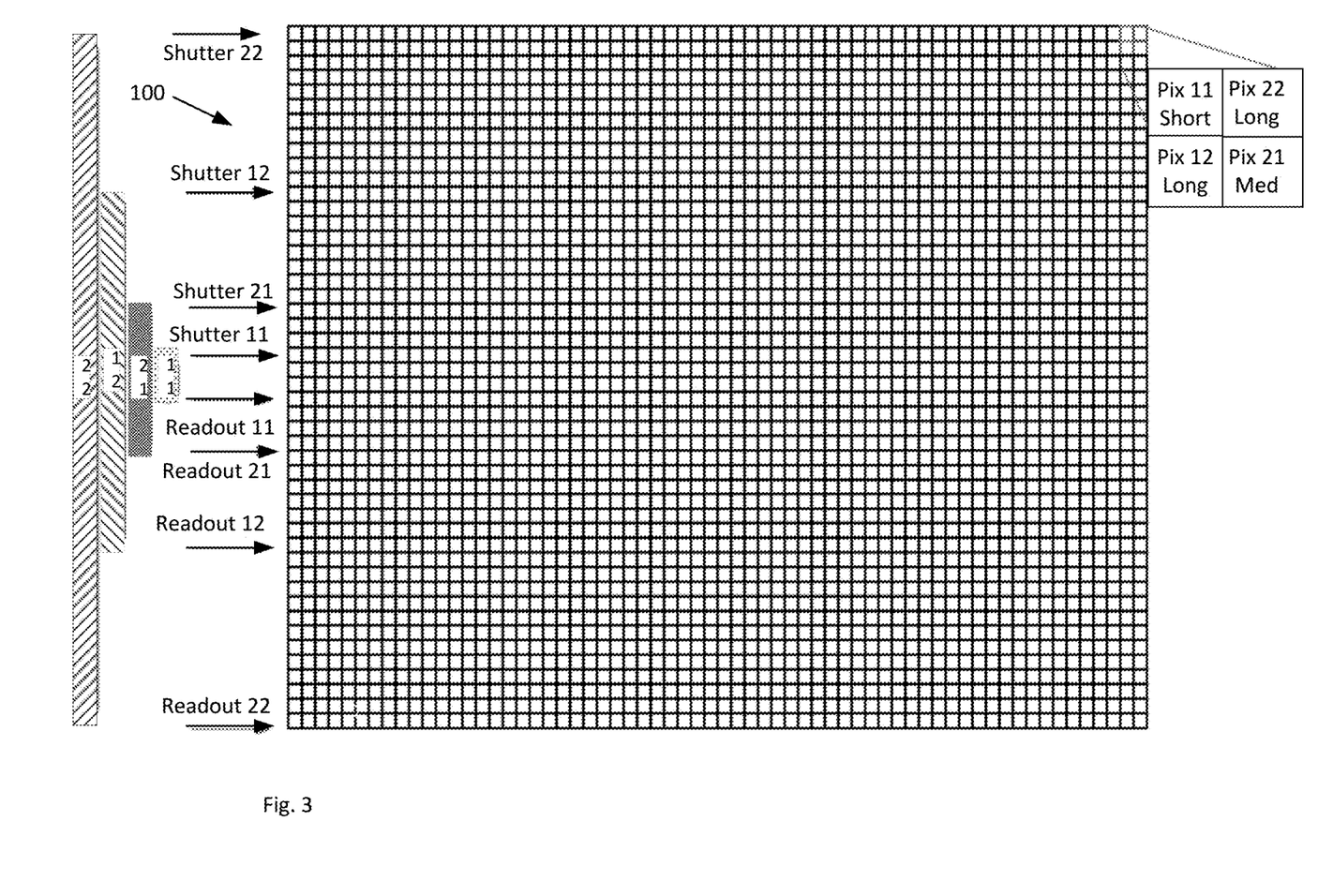
FIG. 3 illustrates a diagram of an example time-centered HDR-readout system for minimizing motion blur in HDR images on an example pixel array of an image sensor with rows of pixels implementing an example rolling shutter.

FIG. 3 illustrates a diagram of an example time-centered HDR-readout system for minimizing motion blur in HDR images on an example pixel array of an image sensor with rows of pixels implementing an example rolling shutter. The image data of the pixel array can be readout line by line, or sub-line by sub-line by setting the row address in a time centered way. The shutter start of the row addresses is controlled by the timing generator block. The pixel array shows an example of four different image captures (e.g. the start of a shutter to the readout of image data). The timing generator sends a signal to start a particular image capture for the image sensor to start the shutter for a given row of pixels and the readout for the collected charge in that given row(s) of pixels in the image sensor. Thus, the start of the integration time for each image capture occurs earlier in time than and is a fixed number of rows from the readout line. The short integration time image captures can be used for bright regions within the scene, while the longer integration time image captures for low light regions.

In an example, the time centered HDR readout at a given time block, the timing generator sends signals to the scanner to start the shutter of row 1 (shutter 22), row 12 (shutter 12), row 21 (shutter 21), and row 35 (shutter 11), starting the integration time for the pixel locations in these sub-rows. Thus, the start of the shutter until the readout for image capture 22 has a long integration time. The start of the shutter until the readout for image capture 12 has the next longest integration time. The start of the shutter until the readout for image capture 21 has the second shortest integration time. Lastly, the start of the shutter until the readout for image capture 11 has the shortest integration time. FIG. 3 also shows graphically bar graphs of the example durations of the integration times for image capture 22, image capture 21, image capture 12, and image capture 11, all of which will be merged together into an HDR image capture. The midpoint in time position for a moving object is different for the different integration times.

Next, the timing generator as directed by the timing centering module sends signals to the scanner to readout out row 29 (readout 11), row 33 (readout 21), row 40 (readout 12), and row 40 (readout 22). The image data for each pixel in each row is readout with an analog to digital converter.

Referring to FIG. 2, the readout consists of selecting the row of pixels being read, resetting the sense node by clocking, and transferring charge from the photodiode(s) of the pixel to the sense node by clocking. The charge from the upper odd rows of pixels and even rows can be routed to the top analog-to-digital converter. The charge from the lower odd rows of pixels and even rows can be routed to the bottom analog-to-digital converter. The timing generator will send signals to the analog-to-digital converter to convert the signals to digital voltage numbers. The digital image data is readout through the sense amplifier. The image data can be spatially reconstructed off the image sensor chip. The image data will at least be temporarily stored in the image data collection memory and the associated cache within the image sensor. When a time centering memory is implemented the image data will then be stored in the time centering memory. The time centering module 100 can be configured to work with either the time centering memory or the image data collection memory and the associated cache to correlate the image data of the moving object in image captures that each have different integration times (in this rolling shutter example) together by the midpoint of their respective integration time.

Figure 4:
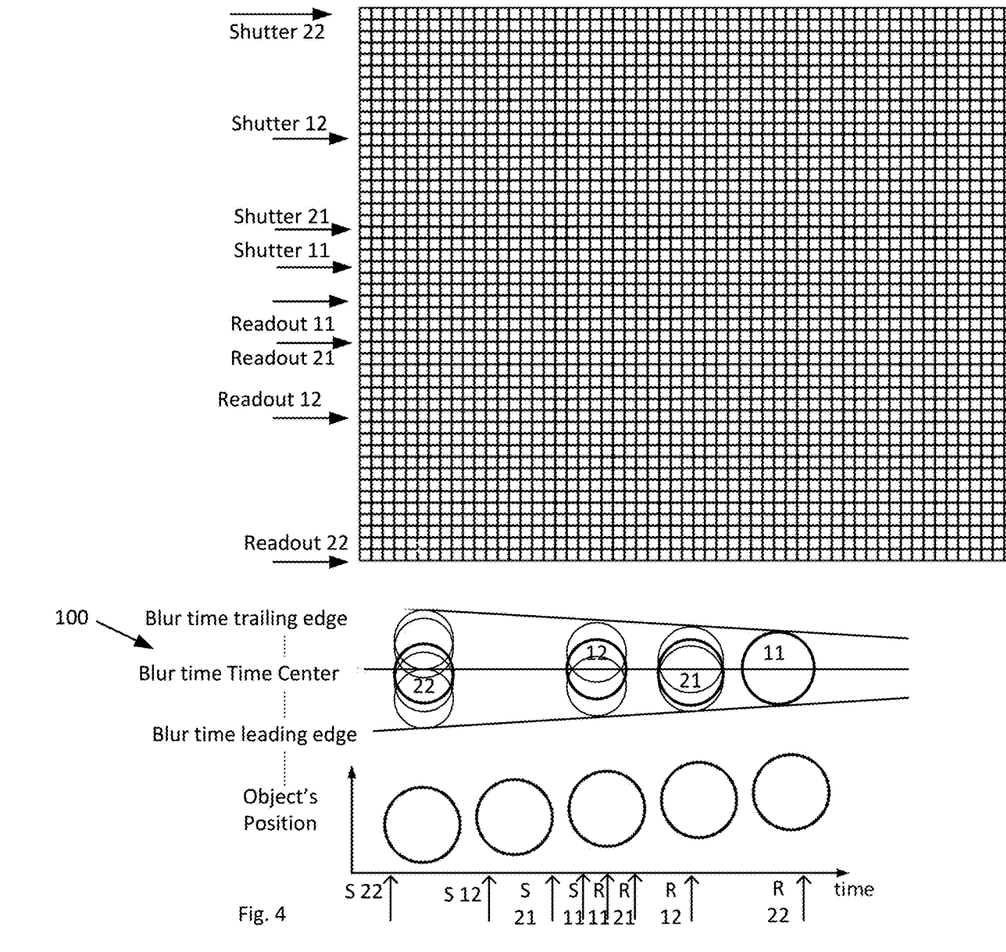
FIG. 4 shows graphically an example of a time-based plotting of an example object moving in an image capture and the amount of blur that is incurred by the different pixels' integration times with regard to the object that is moving during these four different image captures being merged together into the same HDR image capture.

Next, FIG. 4 shows graphically an example of a time-based plotting of an example object moving in an image capture and the amount of blur that is incurred by the different pixels' integration times with regard to the object that is moving during these four different image captures being merged together into the same HDR image capture.

In this example, the object's position is moving slightly from right to left in the sequence of image captures. The image capture 22 is shown as the first image capture. In the first image capture 22, the shutter starts for the row of pixels and the object is in its right most position. When the readout occurs at the end of the integration time for image capture 22, then the object has moved to its most left position. Accordingly, the first image capture 22 containing the moving object has the most amount of blur spanning across its integration time. Next, the image capture 12 is shown as the second image capture. In the second image capture 12, the shutter starts for the row of pixels and the moving object is in its right most position. Note, for image capture 12, the object's right most position is slightly different and more left than the object's beginning position in image capture 22 because the shutter start for image capture 12 occurs later in time than the shutter start for image capture 22. When the readout occurs at the end of the integration time for image capture 12 the object has moved to its most left position. Accordingly, the second image capture 12 of the moving object has the second most amount of blur spanning across its integration time. Next, the image capture 21 is shown as the third image capture. In the third image capture 21, the shutter starts for the row of pixels and the object is in its right most position. When the readout occurs at the end of the integration time for image capture 21, then the object has moved to its most left position. Accordingly, the third image capture 21 containing the moving object has the second least amount of blur spanning across its integration time. The shutter start for the fourth image capture 11 is the furthest in time from the shutter start for the first image capture 22 and the object has moved significantly from the right to the left position in the image capture. In the fourth image capture 11, the shutter starts and the object is in its right most position. However, when the readout occurs at the end of the integration time for image capture 11, then the object has not substantially moved due to the short integration time. Accordingly, the fourth image capture 11 of the object has the least amount of blur spanning across its integration time.

The time centering module 100 correlates the image data from respectively 1) each of the current one or more rows of image data (image captures) that have different integration times together by a midpoint in time of their respective integration time in the rolling shutter, and 2) the current frame of image data and one or more previous frames that have different exposures together by a midpoint in time of their respective integration time/exposure.

In this example, the time centering module 100 aligns the image captures 22, 21, 12, and 11 at each of their midpoints in time in order to merge their respective image data into the HDR image capture.

The time centering module 100 can use comparison algorithms that are not computationally intensive. The time centering module 100 directs the collection of the different data points at a moment when an image capture occurs (e.g. when a readout of row pixels occurs at an end of an integration time), as well as then examines the image data of the image captures being merged into the HDR image capture, and then merely determines midpoints in time of that image data, which is a very simple calculation. The midpoint in time (e.g. average) position for a moving object captured in the images is made to be the same for all integration times being merged into an HDR image capture. Motion blur on the merged data from the different integration times will be reduced; and therefore, the time centering module 100 produces, for example, better images of moving objects during the night or other low light conditions.

In an implementation, the time centering module 100 simply keeps a cache of the previous image data and the current image data and then merely denotes the midpoint in time between those two sets. The time centering module 100 figures out the beginning and the end of the integration times for the captured data and then a midpoint in time for all of the captured image data being merged together in the HDR captured image. The time centering module 100 directs the software pointers for i) the time centered memory and/or the software pointers for the image data collection memory and an associated cache for comparison to align the midpoints in time for each of the image captures being merged.

The time centering module 100 can shift one or more data pointers, such as a shutter address pointer and the readout address pointer, to a time center of an exposure for image data stored in the time center memory for a given row of pixels in the image sensor in order to create the midpoint time/time centered position for all of the integration times making up the multiple image captures at the several different integration times of the same subject matter that are to be merged into the HDR image capture.

The time centering module 100 can direct and coordinate each image capture's readout operation to occur at different times and not occur all at the same time. The time centering module 100 shifts at least the readout pointers to provide a time center readout. Standard schemes start the integration at different times but the readout of each image capture from the pixel array occurs at the same time. Again, the time centering module 100 can direct and coordinate the readout for all pixels in a given HDR image capture. The timing is such that the different pixel types in a given row are readout at different times, such as in a quad pixel implementation.

In an example, the time centering module 100 begins to determine a time center for each one of the rows of image data, then the time centering module 100 will finish the time center determination as the integration time ends for that particular row. Thus, the time center midpoint determination is completed for one image capture of image data while the other rows of pixels are still in the act of collecting their image data for their respective image capture. Thus, the time centering module 100 starts the determination of the midpoint in time of each respective image capture after the integration time ends for that image capture while other rows of the pixel array are still in the act of collecting their image data for the integration time of their image capture in order to not incur additional latency when time centering all of the merged image captures into the compiled HDR image capture. Thus, it's when the integration time ends for a particular row that the time centering module 100 is going to figure out the midpoint in time, rather than when all readouts occur at end of the longest integration, and the reason to do that is because this will minimize latency. For example, when the short duration integration time ends for image capture 11, the time centering module 100 will figure out the midpoint in time for that image capture 11. The time centering module 100 will figure out the midpoint in time for each of the image captures 11, 12, and 21 with a shorter duration than the image capture 22 with the longest amount of integration time. When this longest duration row's integration time ends, the time centering module 100 will figure out the midpoint in time for the longest duration row's integration time. However, the time centering module 100 will have already figured the midpoint in time out for, in this example, the three other integration times of image captures 11, 12, and 21. Therefore, by the time that this last image capture with the longest integration time ends its integration, the time centering module 100 has already calculated the other three midpoints in time and merely has to calculate the midpoint of the last longest integration time. Thus, the time centering module 100 determines the midpoint in time for image captures 11, 12, and 21 while image capture 22 is still in its integration time collecting charge. The time module merely has to calculate the midpoint of the last image capture 22 with the longest integration time via a comparison operation. Thus, the time centering module 100 and this process does not really add substantially any latency between the multiple image captures, and the merging of the image data into an HDR image capture, and then the presentation of that HDR image capture onto a display screen. Thus, the time centering module 100 determining the midpoint in time (e.g. average) position for a moving object captured in the images adds no additional latency compared to the previous readout techniques because readout 22, already the longest integration time, determines when the image data is sent off the chip containing the image sensor.

Referring to FIG. 3, the first bar graph represents the long duration integration time of the image capture 22. All of the other bar graphs have a shorter duration integration time than image capture 22.

In addition, the time centering module 100 utilizes the start of the integration time and the end of the integration time in each image capture stored, in this example, in the time centering module 100 in the rolling shutter implementation to derive the midpoint in time for each image capture to be merged into the HDR image capture. The time centering module 100 performs simple mathematical operations (add, subtract, divide, median determination, etc.) to find the midpoint in time when time centering all of the merged rows of image data for the image captures in a compiled HDR image capture.

The time centering memory performs multiple image captures where the timing of image captures have different integration times and potentially different readout times. However, through the use of read pointers, the midpoint in time for the start of integration and end of integration i) for each pixel in a given row for a rolling shutter implementation, or ii) for a frame for global shutter implementation, can be made to be the same.

Note, for a global shutter readout chip, the readout is replaced by global transfer. Thus, the global transfer for each of the four integration times occurs at a different time.

The time centering module 100 is configured to assist in an HDR image capture that merges image data from multiple image captures with different exposures and/or integration times of essentially the same scene and/or object captured approximately at the same time (typically within 8 microseconds but up to 80 microseconds). The image data from multiple image captures with different exposures and/or integration times of essentially the same scene or object captured are correlated together by a midpoint in time of their respective integration time.

The example method minimizes motion blur for HDR images by time centering the readout for all image captures. The timing is such that the different pixel types in a given row are readout at different times. Here, assuming constant velocity, the timing makes the midpoint in time (e.g. average position) of a moving object the same location for each integration time. For the timing, the shutter address pointers and readout address pointers are shifted to time center the exposure for a given row. In other words, the midpoint in time for a moving object is the same for all integration times. There is no latency compared to when all of the readouts occurred all at the same time because the readout determines when the data is sent off-chip.

Referring to FIG. 2, the time centering module 100 cooperates with an image sensor that is configured to capture two or more image captures at least one of 1) several different lengths of exposures of a same subject matter, 2) several different integration times for that same subject matter, and 3) any combination of these, that are to be merged into a High Dynamic Range (HDR) image capture. The time centering module 100 also cooperates with at least one of:

I) a time centering memory located in an HDR readout pipeline from an output of an image sensor. The time centering module 100 correlates image data of a moving object from the two or more image captures stored in the time centering memory. The time centering module 100 correlates the image data of the moving object from the two or more image captures coming from the image sensor that each have different integration times in a rolling shutter or different lengths of exposures in a global shutter by a midpoint in time of their respective image capture; and II) an image data collection memory and an associated cache within the image sensor. The time centering module 100 makes a comparison between at least one of 1) i) image data containing the moving object in one or more previous image captures to ii) image data containing the moving object in a current image capture in a rolling shutter, and 2) iii) one or more previous frames containing image data of the moving object in previous image captures to iv) a current frame containing image data of the moving object in the current image capture in a global shutter, in order to correlate the image data of the moving object in image captures that each have different integration times and/or different exposures together by a midpoint in time of their respective integration time and/or length of exposure.

The time centering module 100 determines a start of the integration time and an end of the integration time in each image capture stored in the time centering memory in the rolling shutter implementation. The time centering module 100 use the start and end of the integration time to derive the midpoint in time for each image capture to be merged into the HDR image capture. The time centering module 100 determines the length of exposure of each frame of image capture stored in the time centering memory in the global shutter implementation to derive the midpoint in time for each image capture to be merged into the HDR image capture and then to align the image captures along their midpoint in time for each image capture. The time centering module 100 shifts a shutter address pointer and a readout address pointer to a time center of an exposure for image data stored in the time center memory for a given row of pixels in the image sensor in order to create the midpoint time position for all of the integration times making up the multiple image captures at the several different integration times of the same subject matter that are to be merged into the HDR image capture. The time centering module 100 starts the determination of the midpoint in time of each respective image capture after the integration time ends for that image capture while other rows of the pixel array are still in the act of collecting their image data for the integration time of their image capture in order to not incur additional latency when time centering all of the merged image captures into the HDR image capture.

The time centering memory is sized in byte capacity to store at least a half of a frame of image data of a pixel size of the image sensor and in an example is located directly on the image sensor chip. The time centering module 100 cooperates with the image data collection memory and the associated cache to compare between i) the image data containing the moving object of one or more previous image captures stored in the image data collection memory to ii) the image data containing the moving object in the current image capture in the associated cache in the rolling shutter implementation to determine the midpoint in time for the current row of image data and then align the image captures along their midpoint in time for each image capture. The time centering module 100 cooperates with the image data collection memory and the associated cache to compare between i) the one or more previous frames of image data of the image captures and ii) the current frame of image data for the image capture in the global shutter implementation to determine the midpoint in time for the current frame of image data, and then to align the image captures along their midpoint in time for each image capture.

The time centering memory collects image readout data for an HDR image data from a group of N×M pixels (e.g. a quad pixel) that have different integration times within the group of pixels and the time centering module 100 correlates the HDR image data from each of the pixels that have different integration times in the group of N×M pixels together by the midpoint of their respective integration time. FIG. 3 shows a group of N×M pixels, in this example 2×2 pixels making up a single quad pixel where the four photodiodes within that quad pixel are exposed to different amounts of integration time. The first photodiode in the group of N×M pixels, pixel 11 is exposed to a short integration time. The second photodiode in the group of N×M pixels, pixel 21 is exposed to a medium amount of integration time. The third photodiode in the group of N×M pixels, pixel 12 is exposed to a long integration time. The fourth photodiode in the group of N×M pixels, pixel 22 is exposed to the longest integration time. The time centering module 100 analyzes both i) a brightness level of the image data of a scene capturing the moving object and ii) the integration time for a first image capture containing the moving object, and then exclude the first image capture from the time centering and HDR merging process when the first image capture has an integration time longer than a set threshold amount, which also factors in the brightness level of the image data of the scene.

Network

Figure 5:
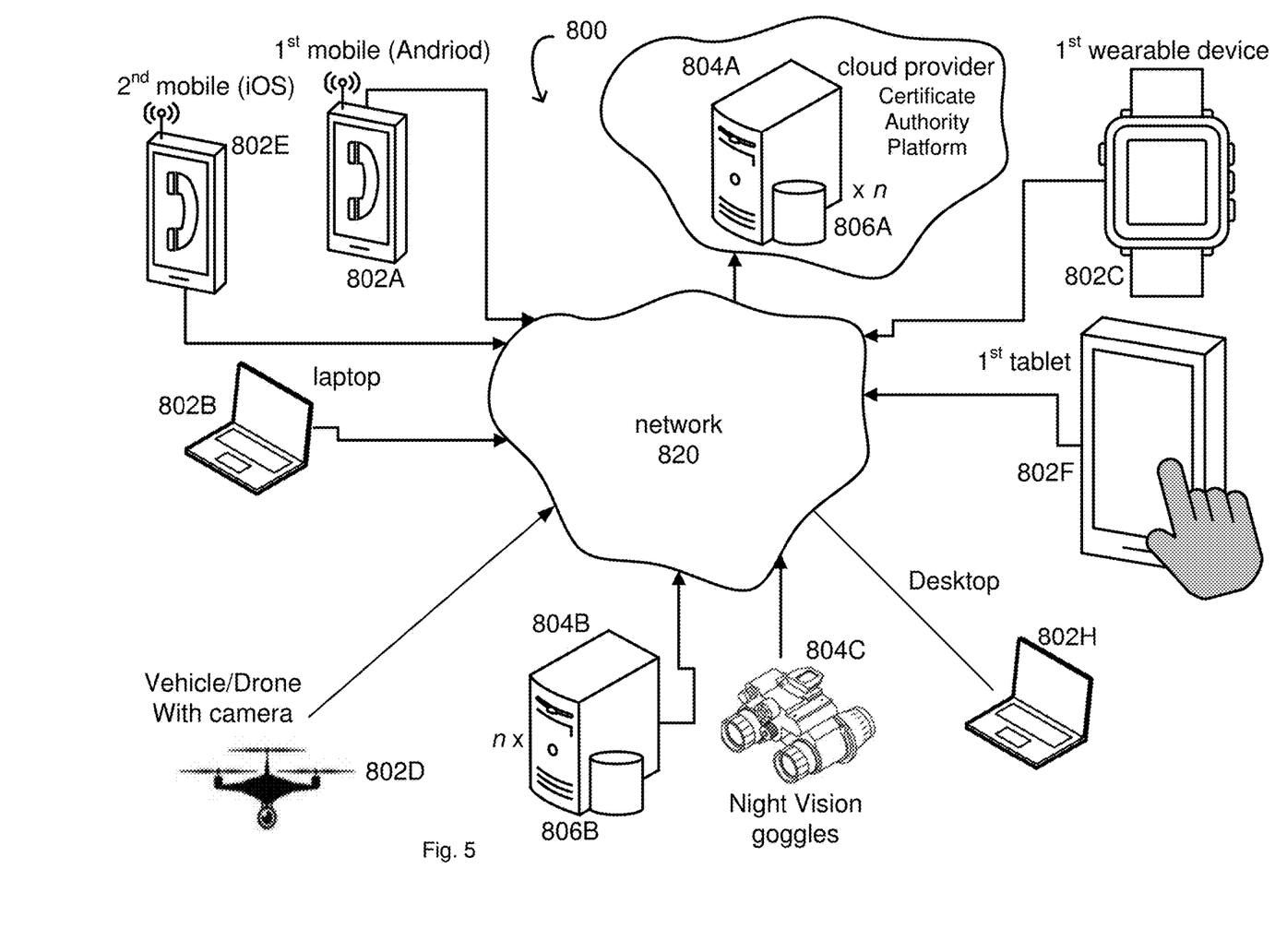
FIG. 5 illustrates a diagram of a number of electronic systems and devices communicating with each other in a network environment in accordance with an embodiment of the time centering module correlating image data of a moving object from the two or more image captures by a midpoint in time to minimize blur.

FIG. 5 illustrates a diagram of a number of electronic systems and devices communicating with each other in a network environment in accordance with an embodiment of the time centering module correlating image data of a moving object from the two or more image captures by a midpoint in time to minimize blur. The network environment 800 has a communications network 820. The network 820 can include one or more networks selected from an optical network, a cellular network, the Internet, a Local Area Network ("LAN"), a Wide Area Network ("WAN"), a satellite network, a fiber network, a cable network, and combinations thereof. In an embodiment, the communications network 820 is the Internet. As shown, there may be many server computing systems and many client computing systems connected to each other via the communications network 820. However, it should be appreciated that, for example, a single client computing system can also be connected to a single server computing system. Thus, any combination of server computing systems and client computing systems may connect to each other via the communications network 820. The camera discussed herein can also reside and be implemented in this network environment, for example, in the cloud platform of server 804A and database 806A, the local server 804B and database 806B, on the device such as laptop 802D, in a smart system such as the smart automobile 802D, partially in the cloud platform server 804A and partially in the device, such as laptop 802D, where the two systems communicate and cooperate with each other, and other similar platforms.

In this example, two night vision cameras can use an image sensor with the time centering module 100 correlating image data of a moving object from the two or more image captures by a midpoint in time to minimize blur. A night camera on a drone 802D, and a night camera in goggles 804C.

The communications network 820 can connect one or more server computing systems selected from at least a first server computing system 804A and a second server computing system 804B to each other and to at least one or more client computing systems as well. The server computing systems 804A and 804B can each optionally include organized data structures such as databases 806A and 806B. Each of the one or more server computing systems can have one or more virtual server computing systems, and multiple virtual server computing systems can be implemented by design. Each of the one or more server computing systems can have one or more firewalls to protect data integrity.

Examples of the client computing systems can include a first mobile computing device 802A (e.g., smartphone with an Android-based operating system), a second mobile computing device 802E (e.g., smartphone with an iOS-based operating system), a first wearable electronic device 802C (e.g., a smartwatch), a first portable computer 802B (e.g., a laptop computer), a third mobile computing device 802F (e.g., tablet with an Android- or iOS-based operating system), a smart device or system incorporated into a first smart vehicle 802D, a smart IoT device, or system incorporated into a first smart bicycle, a goggles 804C, a drone 804D, and the like. Each of the one or more client computing systems can have one or more firewalls to protect data integrity.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication. No hierarchy is implied unless explicitly stated. Both functions can be in a single communicating system or device, in which case, the client-server and server-client relationship can be viewed as peer-to-peer. Thus, if the first portable computer 802B (e.g., the client computing system) and the server computing system 804A can both initiate and respond to communications, their communications can be viewed as peer-to-peer. Additionally, the server computing systems 804A and 804B include circuitry and software enabling communication with each other across the network 820. Server 804B may send, for example, simulator data to server 804A.

Any one or more of the server computing systems can be a cloud provider. A cloud provider can install and operate application software in a cloud (e.g., the network 820 such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser-based applications, 3) the request and response cycle from a dedicated on-line server, 4) the request and response cycle directly between a native application resident on a client device and the cloud-based remote access to another client computing system, and 5) combinations of these.

In an embodiment, the server computing system 804A can include a server engine, a web page management component or direct application component, a content management component, and a database management component. The server engine can perform basic processing and operating-system level tasks. The web page management component can handle the creation and display or routing of web pages or screens associated with receiving and providing digital content and digital advertisements, through a browser. Likewise, the direct application component may work with a client app resident on a user's device. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In an embodiment, a server computing system can be configured to display information in a window, a web page, or the like. An application including any program modules, applications, services, processes, and other similar software executable when executed on, for example, the server computing system 804A, can cause the server computing system 804A to display windows and user interface screens in a portion of a display screen space.

Each application has a code scripted to perform the functions that the software component is coded to carry out such as presenting fields to take details of desired information. Algorithms, routines, and engines within, for example, the server computing system 804A can take the information from the presenting fields and put that information into an appropriate storage medium such as a database (e.g., database 806A). A comparison wizard can be scripted to refer to a database and make use of such data. The applications may be hosted on, for example, the server computing system 804A and served to the specific application or browser of, for example, the client computing system 802B. The applications then serve windows or pages that allow the entry of details.

Computing Systems

Figure 6:
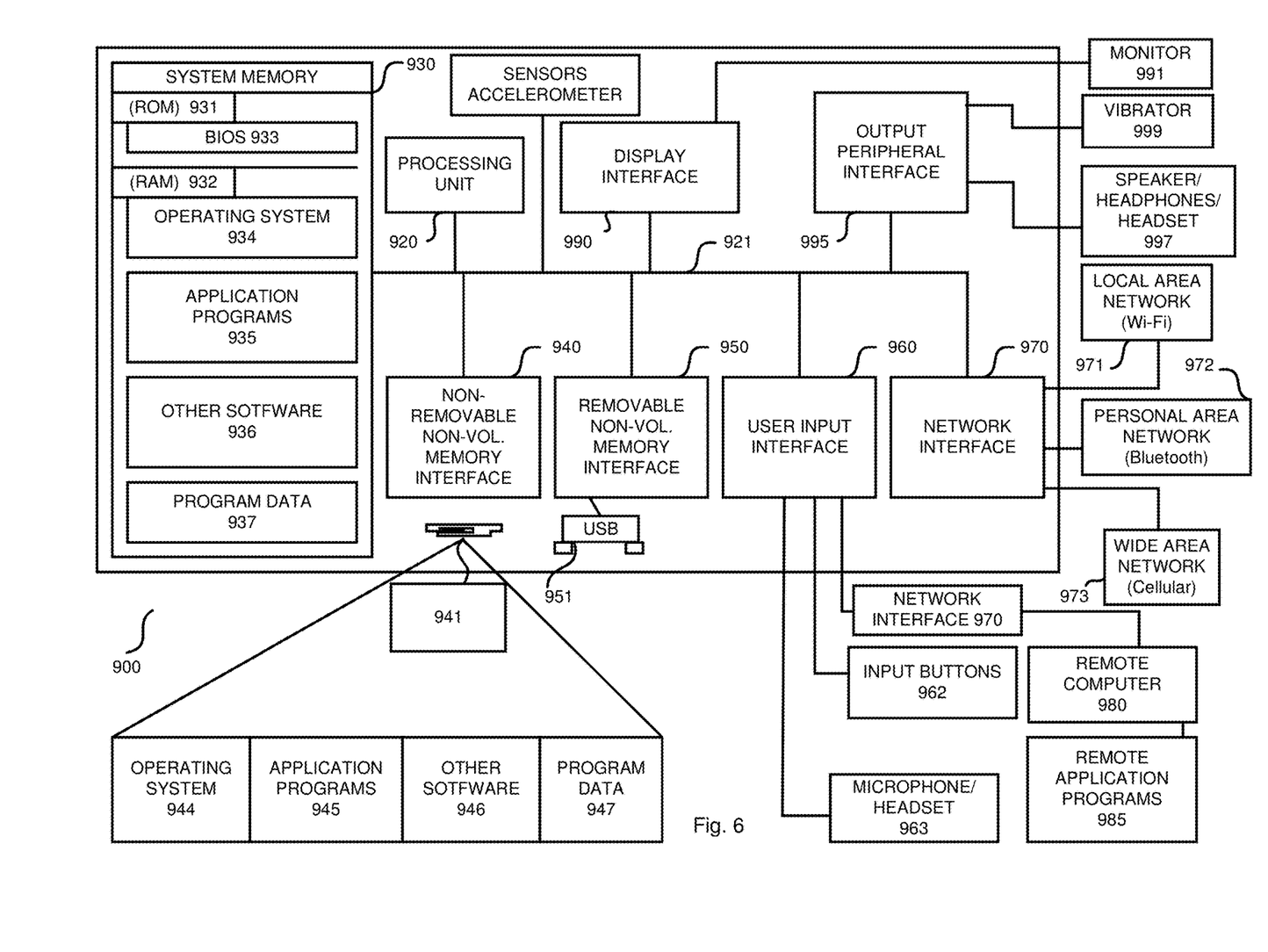
FIG. 6 illustrates a diagram of an embodiment of one or more computing devices that can be a part of the systems associated with firmware stored on a memory with a processor to implement and execute various algorithms and kernels used by components discussed herein.

FIG. 6 illustrates a diagram of an embodiment of one or more computing devices that can be a part of the systems associated with firmware stored on a memory with a processor to implement and execute various algorithms and kernels used by components discussed herein.

The algorithms and kernels can be executed on an example architecture. The example architecture below can be utilized by various computing devices including the cameras discussed herein. The time centering module 100 cooperates with an image sensor that is configured to capture two or more image captures at least one of 1) several different lengths of exposures of a same subject matter, 2) several different integration times for that same subject matter, and 3) any combination of these, that are to be merged into a High Dynamic Range (HDR) image capture as part of a computing device.

The computing device 900 may include one or more processors or processing units 920 to execute instructions, one or more memories 930-932 to store information, one or more data input components 960-963 to receive data input from a user of the computing device 900, one or more modules that include the management module, a network interface communication circuit 970 to establish a communication link to communicate with other computing devices external to the computing device, one or more sensors where an output from the sensors is used for sensing a specific triggering condition and then correspondingly generating one or more preprogrammed actions, a display screen 991 to display at least some of the information stored in the one or more memories 930-932 and other components. Note, portions of this system that are implemented in software 944, 945, 946 may be stored in the one or more memories 930-932 and are executed by the one or more processors 920.

The system memory 930 includes computer storage media in the form of volatile and/or nonvolatile memory such as read-only memory (ROM) 931 and random access memory (RAM) 932. These computing machine-readable media can be any available media that can be accessed by computing system 900. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media such as wireless channels are not included in the machine-readable media.

The system further includes a basic input/output system 933 (BIOS) containing the basic routines that help to transfer information between elements within the computing system 900, such as during start-up, is typically stored in ROM 931. RAM 932 typically contains data and/or software that are immediately accessible to and/or presently being operated on by the processing unit 920. By way of example, and not limitation, the RAM 932 can include a portion of the operating system 934, application programs 935, other executable software 936, and program data 937.

The computing system 900 can also include other removable/non-removable volatile/nonvolatile computer storage media. By way of example only, the system has a solid-state memory 941. The solid-state memory 941 is typically connected to the system bus 921 through a non-removable memory interface such as interface 940, and USB drive 951 is typically connected to the system bus 921 by a removable memory interface, such as interface 950.

A user may enter commands and information into the computing system 900 through input devices such as a keyboard, touchscreen, or software or hardware input buttons 962, a microphone 963, a pointing device and/or scrolling input component, such as a mouse, trackball or touch pad. These and other input devices are often connected to the processing unit 920 through a user input interface 960 that is coupled to the system bus 921, but can be connected by other interface and bus structures, such as a parallel port, game port, or a universal serial bus (USB). A display monitor 991 or other type of display screen device is also connected to the system bus 921 via an interface, such as a display interface 990. In addition to the monitor 991, computing devices may also include other peripheral output devices such as speakers 997, a vibrator 999, and other output devices, which may be connected through an output peripheral interface 995.

The computing system 900 can operate in a networked environment using logical connections to one or more remote computers/client devices, such as a remote computing system 980. The remote computing system 980 can a personal computer, a mobile computing device, a server, a router, a network PC, a peer device or other common network node, and typically includes many or all of the elements described above relative to the computing system 900. The logical connections can include a personal area network (PAN) 972 (e.g., Bluetooth®), a local area network (LAN) 971 (e.g., Wi-Fi), and a wide area network (WAN) 973 (e.g., cellular network), but may also include other networks such as a personal area network (e.g., Bluetooth®). Such networking environments are commonplace in offices, enterprise-wide computer networks, intranets and the Internet. A browser application may be resonant on the computing device and stored in the memory.

When used in a LAN networking environment, the computing system 900 is connected to the LAN 971 through a network interface 970, which can be, for example, a Bluetooth® or Wi-Fi adapter. When used in a WAN networking environment (e.g., Internet), the computing system 900 typically includes some means for establishing communications over the WAN 973. With respect to mobile telecommunication technologies, for example, a radio interface, which can be internal or external, can be connected to the system bus 921 via the network interface 970, or other appropriate mechanism. In a networked environment, other software depicted relative to the computing system 900, or portions thereof, may be stored in the remote memory storage device. By way of example, and not limitation, the system has remote application programs 985 as residing on remote computing device 980. It will be appreciated that the network connections shown are examples and other means of establishing a communications link between the computing devices that may be used.

As discussed, the computing system 900 can include mobile devices with a processing unit 920, a memory (e.g., ROM 931, RAM 932, etc.), and a built-in battery to power the computing device, an AC power input to charge the battery, a display screen, and a built-in Wi-Fi circuitry to wirelessly communicate with a remote computing device connected to the network.

It should be noted that the present design can be carried out on a computing system such as that described with respect to shown herein. However, the present design can be carried out on a server, a computing device devoted to message handling, or on a distributed system in which different portions of the present design are carried out on different parts of the distributed computing system.

In some embodiments, software used to facilitate algorithms discussed herein can be embedded onto a non-transitory machine-readable medium. A machine-readable medium includes any mechanism that stores information in a form readable by a machine (e.g., a computer). For example, a non-transitory machine-readable medium can include read-only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C++, HTTP, Java, Python, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both. Any portions of an algorithm implemented in software can be stored in an executable format in a portion of a memory and is executed by one or more processors. In an embodiment, a module can be implemented in electronic hardware such as logic and other electronic components to perform the functions discussed for that module, software as a block of executable code coded to perform the functions discussed for that module, and/or a combination of software cooperating with electronic hardware.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry. Thus, provided herein are one or more non-transitory machine-readable medium configured to store instructions and data that when executed by one or more processors on the computing device of the foregoing system, causes the computing device to perform the operations outlined as described herein.

References in the specification to "an embodiment," "an example", etc., indicate that the embodiment or example described may include a particular feature, structure, or characteristic, but every embodiment may not necessarily include the particular feature, structure, or characteristic. Such phrases can be not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An apparatus, comprising:
   a time centering module configured to cooperate with an image sensor that is configured to capture two or more image captures at least one of 1) several different lengths of exposures of a same subject matter, 2) several different integration times for that same subject matter, and 3) any combination of these, that are to be merged into a High Dynamic Range (HDR) image capture; and
   where the time centering module is also configured to cooperate with a time centering memory located in an HDR readout pipeline from an output of the image sensor, and
   where the time centering module is configured to correlate image data of a moving object from the image captures stored in the time centering memory in a rolling shutter or different lengths of exposures in a global shutter by a midpoint in time of their respective image capture, and
   where the time centering module is configured to analyze both i) a brightness level of the image data of a scene capturing the moving object and ii) the integration time for a first image capture containing the moving object, and then exclude the first image capture from a time centering and HDR merging process when the first image capture has an integration time longer than a set threshold amount, which also factors in the brightness level of the image data of the scene.

2. The apparatus of claim 1, where the time centering module is configured to shift a shutter address pointer and a readout address pointer to a time center of an exposure for image data stored in the time center memory in order to create the midpoint in time position of their respective image capture.

3. The apparatus of claim 1, where the time centering module is further configured to determine a start of the integration time and an end of the integration time in each image capture stored in the time centering memory in the rolling shutter to derive the midpoint in time.

4. The apparatus of claim 1, where the time centering module is configured to align the image captures along their midpoint in time for each image capture.

5. The apparatus of claim 1, where the time centering module is configured to determine the length of exposure of each frame of image capture stored in the time centering memory in the global shutter to derive the midpoint in time.

6. The apparatus of claim 1, where the time centering memory is sized in byte capacity to store at least a half of a frame of image data of a pixel size of the image sensor and is located on a chip of the image sensor.

7. The apparatus of claim 1, where the time centering module is configured to determine the midpoint in time of each respective image capture after an integration time ends for that image capture while other image captures are still in an act of collecting their image data.

8. An apparatus, comprising:
   a time centering module configured to cooperate with an image sensor that is configured to capture two or more image captures at least one of 1) several different lengths of exposures of a same subject matter, 2) several different integration times for that same subject matter, and 3) any combination of these, that are to be merged into a High Dynamic Range (HDR) image capture; and
   where the time centering module is configured to cooperate with an image data collection memory and an associated cache within the image sensor, where the time centering module is configured to make a comparison between at least one of 1) i) image data containing a moving object in one or more previous image captures to ii) image data containing the moving object in a current image capture in a rolling shutter, and 2) iii) one or more previous frames containing image data of the moving object in previous image captures to iv) a current frame containing image data of the moving object in the current image capture in a global shutter, in order to correlate the image data of the moving object in image captures that each have different integration times and/or different exposures together by a midpoint in time of their respective integration time and/or length of exposure, and where the time centering module is configured to analyze both i) a brightness level of the image data of a scene capturing the moving object and ii) the integration time for a first image capture containing the moving object, and then exclude the first image capture from a time centering and HDR merging process when the first image capture has an integration time longer than a set threshold amount, which also factors in the brightness level of the image data of the scene.

9. The apparatus of claim 8, where the time centering module is configured to align the image captures along their midpoint in time for each image capture.

10. The apparatus of claim 8, where the time centering module is configured to determine the midpoint of the first image capture while other image captures are still being collected.

11. The apparatus of claim 8, where the time centering module is configured to cooperate with the image data collection memory and the associated cache to compare between i) the one or more previous frames of image data of the image captures and ii) the current frame of image data for the image capture in the global shutter to determine the midpoint in time for the current frame of image data.

12. The apparatus of claim 8, where the time centering module is configured to cooperate with the image data collection memory and the associated cache to compare between i) the image data containing the moving object of one or more previous image captures stored in the image data collection memory to ii) the image data containing the moving object in the current image capture in the associated cache in the rolling shutter to determine the midpoint in time for a current row of image data and then align the image captures along their midpoint in time for each image capture.

13. An apparatus, comprising:
a time centering module configured to cooperate with an image sensor that is configured to capture two or more image captures at least one of 1) several different lengths of exposures of a same subject matter, 2) several different integration times for that same subject matter, and 3) any combination of these, that are to be merged into a High Dynamic Range (HDR) image capture; and
where the time centering module is also configured to cooperate with at least one of
I) a time centering memory located in an HDR readout pipeline from an output of the image sensor, where the time centering module is configured to correlate image data of a moving object from the two or more image captures stored in the time centering memory, where the time centering module is configured to correlate the image data of the moving object from the two or more image captures coming from the image sensor that each have different integration times in a rolling shutter or different lengths of exposures in a global shutter by a midpoint in time of their respective image capture, and II) an image data collection memory and an associated cache within the image sensor, where the time centering module is configured to make a comparison between at least one of 1) i) image data containing the moving object in one or more previous image captures to ii) image data containing the moving object in a current image capture in the rolling shutter, and 2) iii) one or more previous frames containing image data of the moving object in previous image captures to iv) a current frame containing image data of the moving object in the current image capture in the global shutter, in order to correlate the image data of the moving object in image captures that each have different integration times and/or different exposures together by the midpoint in time of their respective integration time and/or length of exposure, and where the time centering module is configured to analyze both i) a brightness level of the image data of a scene capturing the moving object and ii) the integration time for a first image capture containing the moving object, and then exclude the first image capture from a time centering and HDR merging process when the first image capture has an integration time longer than a set threshold amount, which also factors in the brightness level of the image data of the scene.

14. The apparatus of claim 13, where the time centering module is configured to correlate the HDR image data from each of the pixels that have different integration times within a group of N×M pixels together by the midpoint of their respective integration time.

15. A method for an image sensor, comprising:
configuring a time centering module to cooperate with the image sensor that is configured to capture two or more image captures at least one of 1) several different lengths of exposures of a same subject matter, 2) several different integration times for that same subject matter, and 3) any combination of these, that are to be merged into a High Dynamic Range (HDR) image capture;
configuring the time centering module to also cooperate a time centering memory located in an HDR readout pipeline from an output of the image sensor, where the time centering module is configured to correlate image data of a moving object from the two or more image captures stored in the time centering memory coming from the image sensor that each have different integration times in a rolling shutter or different lengths of exposures in a global shutter by a midpoint in time of their respective image capture; and
configuring the time centering module to analyze both i) a brightness level of the image data of a scene capturing the moving object and ii) the integration time for a first image capture containing the moving object, and then exclude the first image capture from a time centering and HDR merging process when the first image capture has an integration time longer than a set threshold amount, which also factors in the brightness level of the image data of the scene.

16. The method of claim 15, further comprising:
configuring the time centering module to align the image captures along their midpoint in time for each image capture.

17. The method of claim 15, further comprising:
configuring the time centering module to shift a shutter address pointer and a readout address pointer to a time center of an exposure for image data stored in the time center memory in order to create the midpoint in time.

18. The method of claim 15, further comprising:
configuring the time centering module to determine the midpoint of the first image capture while other image captures are still being collected.

* * * * *